(12) United States Patent
Ma et al.

(10) Patent No.: US 11,659,421 B2
(45) Date of Patent: May 23, 2023

(54) TENSOR DECOMPOSITION-BASED BIG DATA PROCESSING SYSTEM AND PROCESSING METHOD FOR SPECTRUM MONITORING

(71) Applicant: XI'AN DAHENG TIANCHENG IT CO., LTD., Xi'an (CN)

(72) Inventors: Hongguang Ma, Xi'an (CN); Jinku Guo, Xi'an (CN); Qinbo Jiang, Xi'an (CN); Zhiqiang Liu, Xi'an (CN)

(73) Assignee: XI'AN DAHENG TIANCHENG IT CO., LTD., Xi'an (CN)

( * ) Notice: Subject to any disclaimer, the term of this patent is extended or adjusted under 35 U.S.C. 154(b) by 263 days.

(21) Appl. No.: 17/117,601

(22) Filed: Dec. 10, 2020

(65) Prior Publication Data

US 2021/0392523 A1 Dec. 16, 2021

(30) Foreign Application Priority Data

Jun. 16, 2020 (CN) .................... CN202010547293.0

(51) Int. Cl.
*H04W 24/08* (2009.01)
(52) U.S. Cl.
CPC .................................. *H04W 24/08* (2013.01)
(58) Field of Classification Search
CPC ..................................................... H04W 24/08
USPC ......................................................... 370/252
See application file for complete search history.

(56) References Cited

U.S. PATENT DOCUMENTS

| | | | | |
|---|---|---|---|---|
| 6,243,730 B1 * | 6/2001 | Wang | .................... | G06F 17/147 708/401 |
| 2003/0099291 A1 * | 5/2003 | Kerofsky | ............. | H04N 19/136 375/E7.184 |
| 2006/0085497 A1 * | 4/2006 | Sehitoglu | .............. | G06F 17/142 708/405 |

FOREIGN PATENT DOCUMENTS

| | | | | | |
|---|---|---|---|---|---|
| CN | 108509506 | A | * | 9/2018 | ............. G01R 23/02 |
| CN | 108732423 | A | * | 11/2018 | ............. G01R 23/16 |

OTHER PUBLICATIONS

CN108732423A—English Machine Translation (Year: 2018).*
CN108509506A—English Machine Translation (Year: 2018).*

* cited by examiner

*Primary Examiner* — Christopher M Crutchfield
*Assistant Examiner* — Jean F Voltaire
(74) *Attorney, Agent, or Firm* — Novoclaims Patent Services LLC; Mei Lin Wong

(57) ABSTRACT

A method of processing spectrum monitoring (SM) big data based on tensor decomposition comprises the steps of: S1: processing calibration of geolocation V, synchronized clock t, synchronized time $t_n(0 \ldots N)$; of SM stations and determining SM sampling point M and bandwidth B; S2: processing discretization for a monitoring time and structured processing of SM data for a monitoring period to obtain a one-dimensional SM sequence $I_{t_n}$ at the given sampling time and a two-dimensional SM matrix W at the given monitoring period; S3: constructing a cuboid matrix Q based on the two-dimensional SM matrix W, processing tensor decomposition for the cuboid matrix Q and identify the emitter.

7 Claims, 7 Drawing Sheets

TENSOR DECOMPOSITION-BASED BIG DATA PROCESSING SYSTEM AND PROCESSING METHOD FOR SPECTRUM MONITORING

BACKGROUND OF THE PRESENT INVENTION

Field of Invention

The present invention relates to the technical field of spectrum monitoring data processing, and particularly relates to a spectrum monitoring (SM) big data processing system and processing method which is based on tensor decomposition.

Description of Related Arts

The regional spectrum monitoring big data processing system is a new type of spectrum monitoring system based on the new generation of internet technology. With the promotion and application of 5G technology, the transmission, storage, and processing of big data has become a reality. In the field of spectrum monitoring, due to the limitation of network throughput in the past, the traditional spectrum monitoring data processing method are mainly to process spectrum monitoring data in a "point" manner. It is difficult to share the data of monitoring stations. As a result, there is the phenomenon of so-called "information islands", which causes problems such as blind spots and low utilization of monitoring data. Processing regional spectrum monitoring data to obtain detailed spectrum usage status is the basis for reasonable and efficient spectrum resource utilization and spectrum management. Especially with the gradual acceleration of the development of spectrum monitoring networks, the demand for data transmission and processing between spectrum monitoring stations and different spectrum management units continues to increase. The need for in-depth mining of regional spectrum monitoring data and the use of big data methods to obtain more information has become very urgent.

The purpose of spectrum monitoring is to measure the working status and spectrum occupancy rate of the emitters in the monitoring area in real time and their changes over time. Therefore, the spectrum monitoring data is closely related to time t, frequency fc and geographic space s, which can be represented by a functional expression $X=f(t,f_c,s)$. Therefore, three-dimensional spectrum monitoring data processing in t-f-s dimensions must be better than any two-dimensional data processing method and can overcome the shortcomings of traditional methods.

SUMMARY OF THE PRESENT INVENTION

With reference to the rapid development of spectrum monitoring network (SMN), the present invention provides a big data processing system and an emitter identification and positioning method for regional spectrum monitoring. Based on the accurate time synchronous sampling of the environmental electromagnetic situation by each monitoring node in the monitoring system, a 3D matrix of spectrum monitoring data can be constructed at the gateway node. Therefore, a tensor decomposition method can be used to comprehensively analyze and process the SM data in the time-frequency-geolocation dimensions to improve the accuracy of emitter identification In order to achieve the objective above, the technical solution of the present invention provides a tensor decomposition-based big data processing method for spectrum monitoring, which comprises the steps of:

S1: calibration of spectrum monitoring station: processing calibration of parameters of a geolocation V, a synchronized clock t, a synchronized time $t_n(0 \ldots N)$, and determining spectrum monitoring sampling point M and bandwidth B;

S2: preprocessing of spectrum monitoring data: processing discretization of spectrum monitoring data at a monitoring time completely and a structured processing of spectrum monitoring data for a monitoring period to obtain a one-dimensional spectrum monitoring sequence $I_{t_n}$ at the given sampling time and a two-dimensional spectrum monitoring matrix W at the given monitoring period;

S3: constructing a cuboid matrix Q based on the two-dimensional spectrum monitoring matrix W and processing tensor decomposition for the cuboid matrix Q.

The present invention further provides a spectrum monitoring big data processing system based on tensor decomposition, which comprises a station calibration and synchronization module, a spectrum monitoring data preprocessing module, and a spectrum monitoring big data processing module, wherein the station calibration and synchronization module processes calibration of parameters of a spectrum monitoring station, and determining spectrum monitoring sampling point M and bandwidth B, wherein the parameters comprise a geolocation V, a synchronized clock t, a synchronized time $t_n(0 \ldots N)$;

the spectrum monitoring data preprocessing module completes discretization processing of spectrum monitoring data at a given monitoring time and structured processing of spectrum monitoring data for a given monitoring period to obtain a one-dimensional spectrum monitoring sequence $I_{t_n}$ at the given monitoring time and a two-dimensional spectrum monitoring matrix W at the given monitoring period; and the spectrum monitoring big data processing module constructs a cuboid matrix Q based on the two-dimensional spectrum monitoring matrix W and processes tensor decomposition for the cuboid matrix Q.

The advantageous effects of the tensor decomposition-based big data processing system and processing method for spectrum monitoring of the present invention are as follows:

The spectrum monitoring big data processing system of the present invention can unify the standardized processing process of spectrum monitoring data to form a data processing flow that meets the requirements of the spectrum monitoring network system, thereby capable of facilitating the efficient use of regional spectrum monitoring data through realization of grid-based emitter positioning.

DETAILED DESCRIPTION OF THE PREFERRED EMBODIMENT

Figure 1:
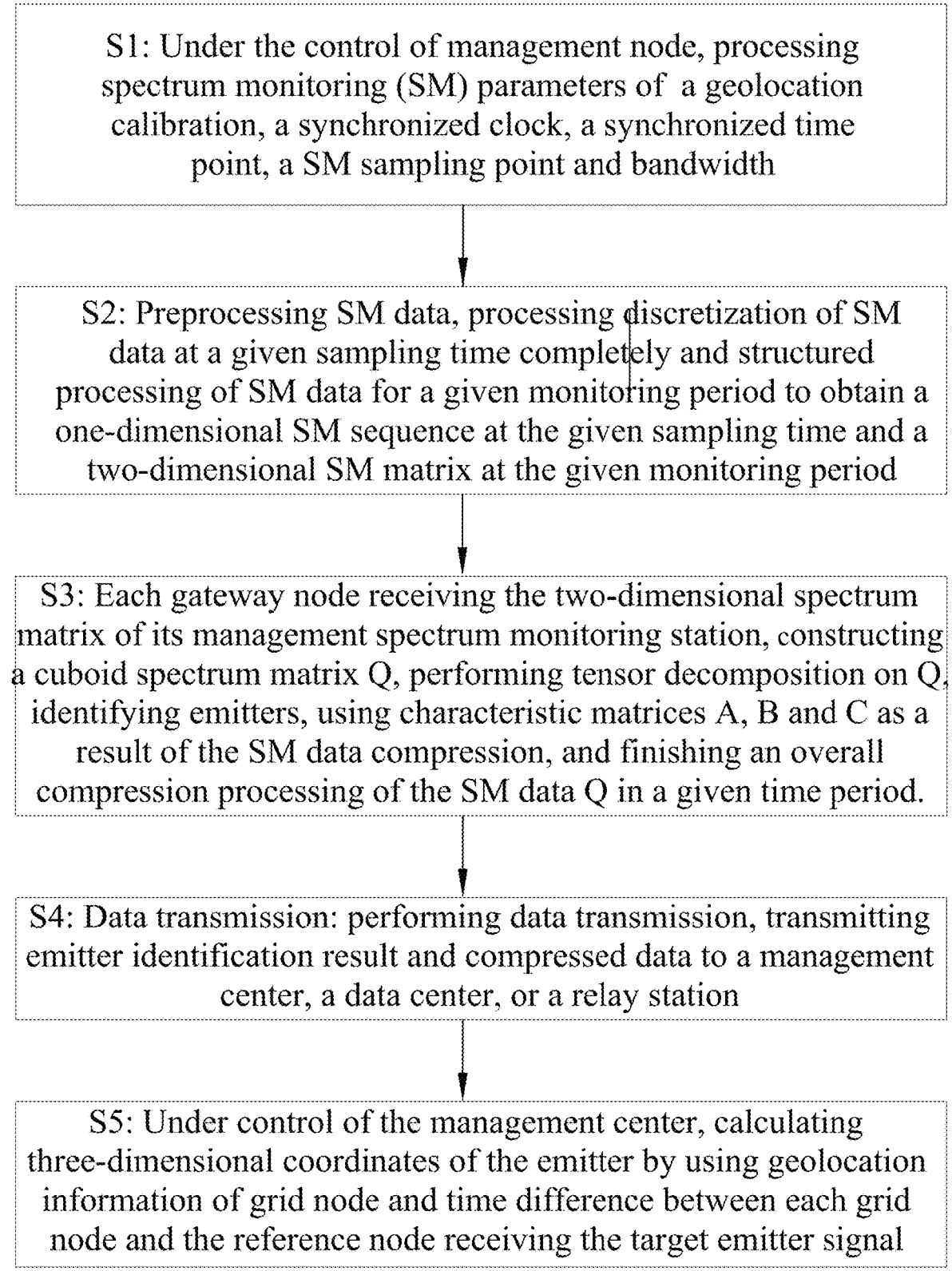
FIG. 1 is a flow chart of the spectrum monitoring data processing method according to a preferred embodiment of the present invention.

In order to make the objectives, technical solutions and advantages of the embodiments of the present invention clearer, the technical solutions in the embodiments of the present invention will be described clearly and completely in conjunction with the accompanying drawings in the embodiments of the present invention. Obviously, the described embodiments are only some of the typical embodiments of the present invention, rather than all the embodiments. The components of the embodiments of the present invention generally described and shown in the drawings herein may be arranged and designed in various different configurations. Therefore, the following detailed description of the embodiments of the present invention provided in the accompanying drawings is not intended to limit the scope of the claimed invention, but merely represents selected embodiments of the present invention. Based on the embodiments of the present invention, all other embodiments obtained by those skilled in the art without inventive work shall fall within the protection scope of the present invention.

FIG. 1 illustrates a spectrum monitoring (SM) data processing method according to a preferred embodiment of the present invention. The application of the present invention is mainly in the big data processing of regional spectrum monitoring, which is beneficial to more reasonable and efficient use of the spectrum monitoring data from multiple stations. The method of processing big data for regional spectrum monitoring based on tensor decomposition includes the following steps S1 to S5.

S1: Under the control of the management node, processing spectrum monitoring parameters of SM station consisting of a geolocation calibration, a synchronization clock t, a synchronization time point $t_n$(0 ... N), a SM sampling point M, and a bandwidth B, where n equals to 0, 1, 2, ..., N, and N is a positive integer;

S2: Preprocessing SM data: processing discretization of SM data at a given sampling time completely and structured processing of SM data for a given monitoring period to obtain a one-dimensional SM sequence $I_{t_n}$ at the given sampling time and a two-dimensional SM matrix W at the given monitoring period.

Specifically, within the given spectrum bandwidth, according to the required number of spectrum sampling points, obtain a one-dimensional SM sequence at the given sampling time $I_{t_n}$, and a dimension of the SM sequence $I_{t_n}$ is 1×M. According to the sampling time interval of the SM data, arranging the SM sequence at different sampling time in chronological order to form a two-dimensional spectrum matrix W=[$I_{t_0}$ $I_{t_1}$ ... $I_{t_N}$], where a dimension of the two-dimensional spectrum matrix W is N×M.

Figure 2:
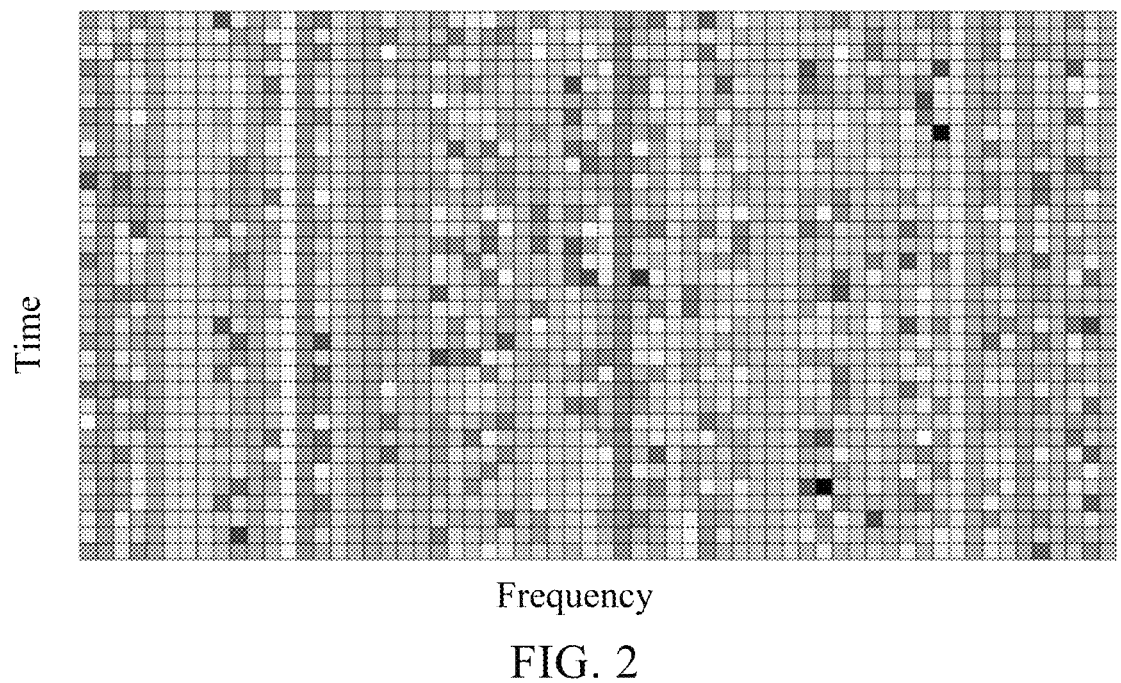
FIG. 2 is a schematic diagram of a two-dimensional spectrum matrix of spectrum monitoring data according to the above preferred embodiment of the present invention.

According to the present invention, the two-dimensional spectrum matrix is a type of matrix with specific meaning, which is shown in FIG. 2 of the drawings. The two-dimensional matrix is derived from the traditional mathematical matrix in which the two dimensions of the two-dimensional spectrum correspond to the time dimension and the frequency dimension of the SM data, and the element values in the two-dimensional spectrum correspond to a detected power level at a certain time and frequency (amplitude). Therefore, the two-dimensional spectrum matrix associates the time dimension, frequency dimension, and energy dimension of the electromagnetic spectrum monitoring data, which is a two-dimensional structured representation of spectrum monitoring data. Compared with traditional matrix operations, the corresponding operations of the two-dimensional spectrum matrix have corresponding physical meanings.

S3: each gateway node receiving the two-dimensional spectrum matrix of its management spectrum monitoring station, constructing a cuboid spectrum matrix W (corresponding to time, frequency and geolocation, where the geolocation refers to the score of stations), performing tensor decomposition on Q, identifying emitters, using characteristic matrices A, B and C as a result of the SM data compression, and finishing an overall compression processing of the SM data in a given time period. The loading matrices A, B, and C are the tensor decomposition results of the stereo cuboid matrix Q, and the amount of data is much smaller than the cuboid matrix Q.

Figure 3:
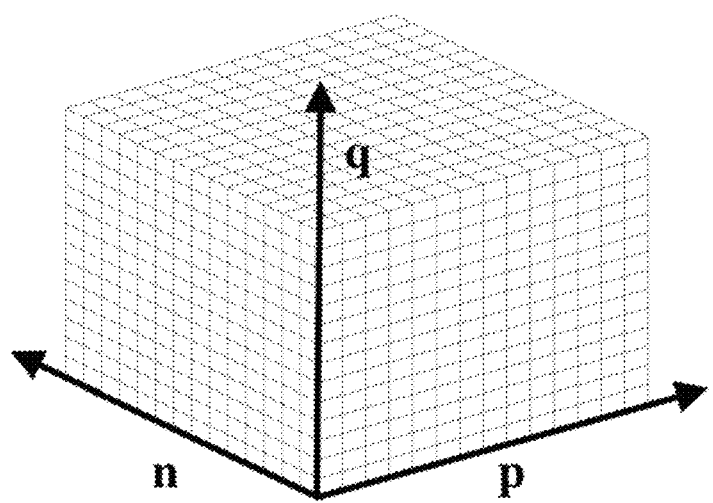
FIG. 3 is a schematic diagram of a cuboid spectrum matrix of spectrum monitoring data according to the above preferred embodiment of the present invention.

The three-dimensional spectrum matrix of the present invention is formed by superimposing the two-dimensional spectrum matrix of each monitoring station according to the rule (see FIG. 3). Because each monitoring station achieves accurate synchronization in the time-frequency dimension and the geolocation information of the station is clear and definite, the matrix contains the variation characteristics of the spectrum monitoring data in time, frequency, and space dimensions. After tensor decomposition processing, more emitter information can be obtained when compared to the two-dimensional spectrum matrix of a single station, thus having a significant theoretical advancement.

The representative tensor analysis method is the PARAFAC algorithm. The spectrum cuboid matrix Q proposed by the present invention is a kind of tensor structure data in a mathematical sense, which can be expressed as: $Y \in C^{I \times J \times K}$ The PARAFAC algorithm decomposes the tensor Y into $$Y = \sum_{r=1}^{R} a_r \circ b_r \circ c_r,$$

where $a_r$, $b_r$, $c_r$, are the column vectors of loading matrices $A \in C^{I \times R}$, $B \in C^{J \times R}$, $C \in C^{K \times R}$ obtained in the time, frequency and space dimensions after tensor decomposition respectively, R is the rank of the tensor Y, and the symbol ∘ represents the outer product of the vectors. Therefore, $(a_r \circ b_r \circ c_r)_{ijk} = a_{ir}b_{jr}c_{kr}$ is to approximate the original tensor by using feature vectors in a three-dimension aspect, and is an extension of eigenvalue decomposition in high-dimensional matrix.

When performing PARAFAC decomposition on a spectrum monitoring data matrix with a tensor structure, the validity of the result depends on the degree of fit (Core consistency test or Model fitness, MF) between the slices of each dimension formed by the loading matrix $A \in C^{I \times R}$, $B \in C^{J \times R}$, $C \in C^{K \times R}$ and the measured data matrix after a limited number of iterations. In general, 80%≤MF≤100% is appropriate decomposition, 40%<MF<80% is quasi-appropriate decomposition, MF<40% is invalid decomposition.

S4: Data transmission: performing data transmission, transmitting emitter identification result and compressed data to a management center, a data center, or a relay station.

S5: under control of the management center, calculating three-dimensional coordinates of the emitter by using geolocation information of grid node and time difference between each grid node and the reference node receiving the target emitter signal.

In particular, step S2 of reprocessing SM data comprises steps S2.1-S2.5 as follows:

S2.1: Obtain the spectrum monitoring data at the sampling time $t_n$.

S2.2: Process discretization of the spectrum monitoring data for the sampling time within a given bandwidth B based on a required number of sampling points M to obtain the one-dimensional spectrum monitoring sequence $I_{t_n}$ at the given sampling time, and a dimension of $I_{t_n}$ is 1×M.

S2.3: Obtain the spectrum monitoring sequence $I_{t_0}$ $I_{t_1}$ ... $I_{t_N}$ at different sampling time for a given monitoring period according to a sampling time interval of the monitoring data.

S2.4: Aligning the spectrum monitoring sequences at different sampling time in chronological order to form a two-dimensional matrix $W=[I_{t_0} I_{t_1} \ldots I_{t_N}]^T$, the matrix W is a two-dimensional matrix in N×M dimension.

S2.5: Each two-dimensional spectrum matrix W is accompanied by additional monitoring information, which includes monitoring station geolocation information, sampling time and interval, frequency band, etc.

Step S3 of the above method of processing spectrum monitoring comprises the followings steps S3.1-S3.6.

S3.1: Calculate a geographical center point $V_0$ on a geographical distribution according to latitude, longitude and height position $V_n$(lat, lon, h) of K number of spectrum monitoring stations, where n equals to 1, 2, 3, ..., K, where $$V_0 = \frac{1}{K} \sum_{i=1}^{K} V_i \quad (1)$$

S3.2: Calculate the distance $D_n$ between $V_n$ of each spectrum monitoring station and the geographic center point $V_0$, where $\|\cdot\|_2$ is the second-order norm:

$$D_n = \|V_n - V_0\|_2 \quad (2)$$

S3.3: Along an ascending order of the distance $D_n$ between each spectrum monitoring station and the geographic center point $V_0$, arrange the corresponding spectrum matrix of the station to construct the spectrum monitoring network cuboid matrix Q, where $Q=[W_1, W_2, \ldots W_K]^T$.

S3.4: Perform tensor decomposition on the three-dimensional cuboid matrix Q, setting an analysis bandwidth F and dividing the cuboid matrix Q according to the analysis bandwidth F into segments, processing tensor decomposition for each segment, determining a validity of the tensor decomposition by setting MF>80% as a criterion of the validity; if MF<80%, the analysis bandwidth F is reduced to half, and the segments that does not meet the validity requirement is divided into segments according to the reduced analysis bandwidth F to re-process with tensor decomposition until the validity requirement are met or the minimum analysis bandwidth is reached (in this case, the data should be treated as invalid).

S3.5: based on the results of tensor decomposition, calculate a center frequency, frequency occupancy, time occupancy, space occupancy of the emitters, and evaluate the environmental complexity.

S3.6: Perform K-L divergence (Kullback-Leibler Divergence) and mutual information calculations on the co-frequency emitters to identify whether they are the independent emitters.

Step S5 of the above method of processing spectrum monitoring comprises the followings steps S5.1-S5.4. S5.1:

S5.1: Prepare a list of emitter characteristic parameters sent by the management center to the gateway nodes of each sub-network, sort out the monitoring stations according to signal strength of a target emitter received by the monitoring station, and determine a number of stations that effectively receive an emitter signal N.

S5.2: if the number of valid monitoring stations N≥4, construct the valid monitoring stations into an emitter positioning grid, arrange the monitoring stations in order according to S3.1-S3.3 and determine the reference station.

S5.3: Calculate a distance between each of the monitoring station and the reference station; under the control of the management center, each of the monitoring stations measure an arrival time of the target emitter signal and send the measured results to the management center.

S5.4: the management center estimates the geolocation of the emitter based on a difference between the arrival time of the target emitter signal and the distance between the monitoring station and the reference station.

Figure 4:
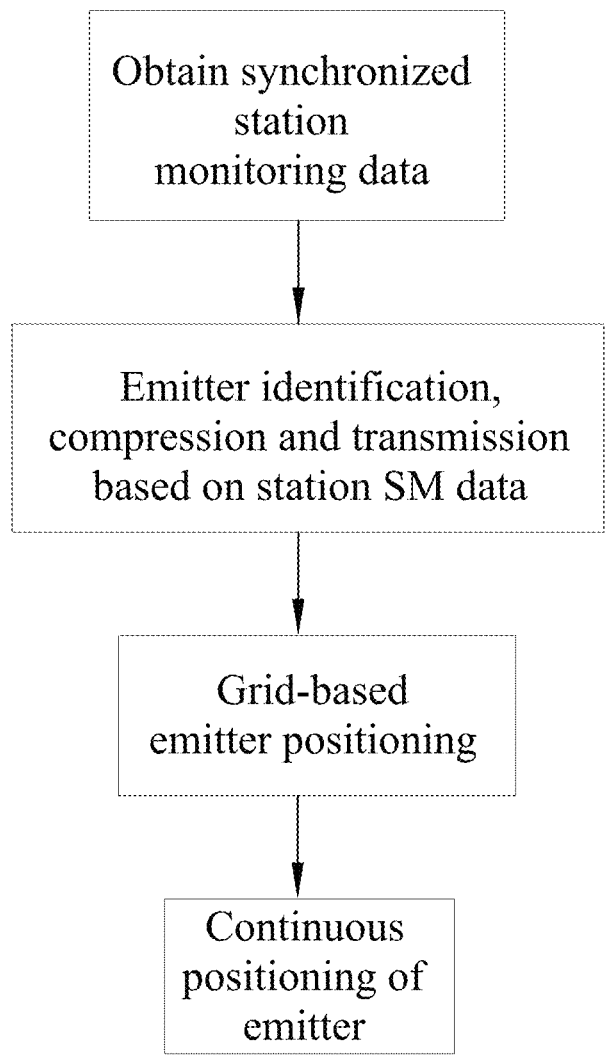
FIG. 4 is a flow chart of the emitter positioning method in the spectrum monitoring data processing method according to the preferred embodiment of the present invention.
Figure 5:
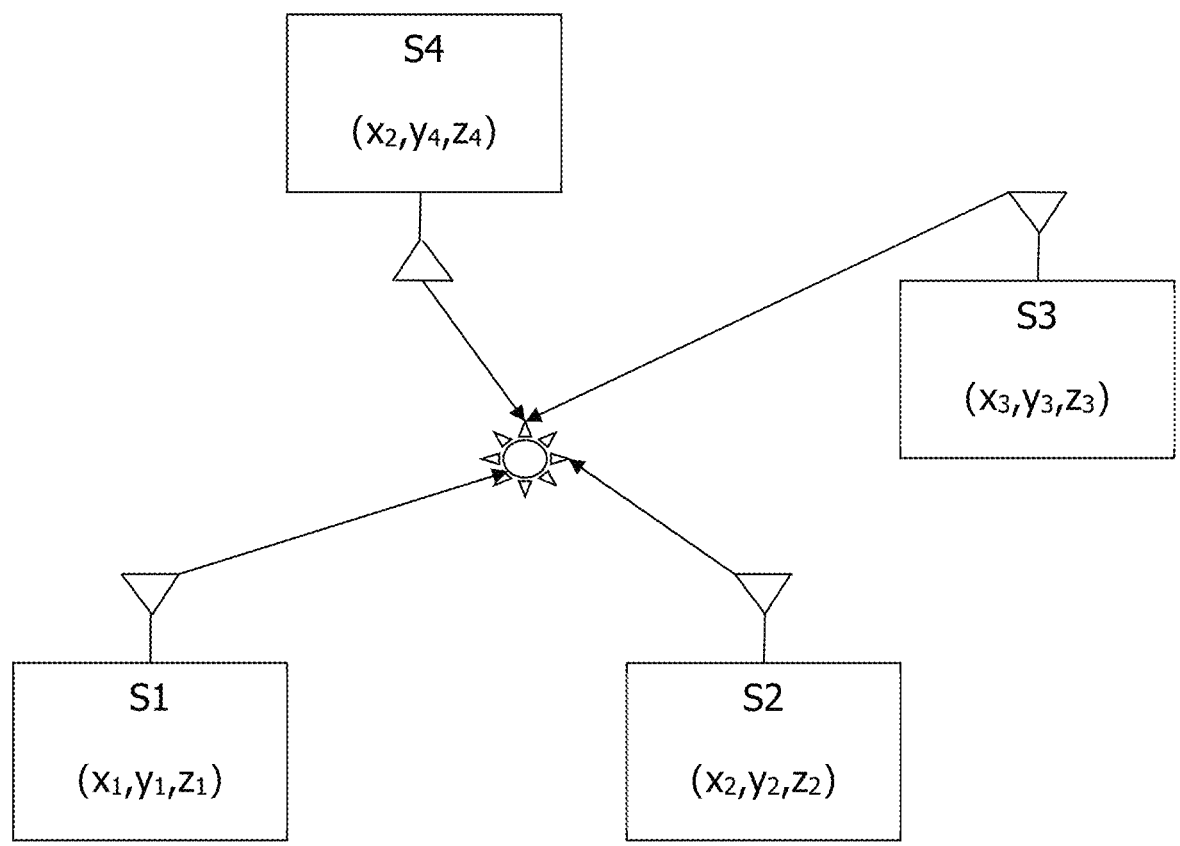
FIG. 5 is a schematic diagram of the grid-based emitter positioning according to the preferred embodiment of the present invention.
Figure 6:
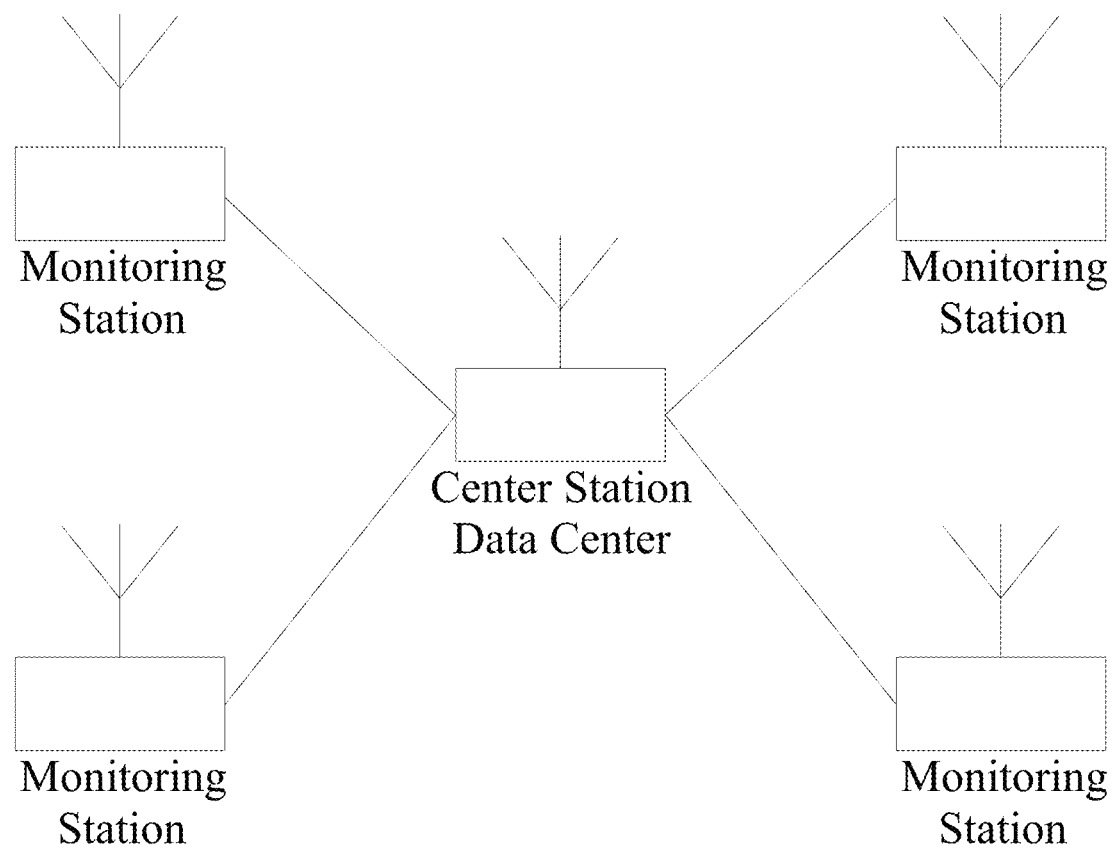
FIG. 6 is a schematic diagram of an application scenario of the spectrum monitoring data processing system according to the preferred embodiment of the present invention.

More specifically, as shown in FIG. 4 and FIG. 5 of the drawings, step S3.5 comprises the following steps:

S3.5.1: Set an analysis bandwidth F, divide the cuboid matrix Q according to the analysis bandwidth F into segments, process tensor decomposition for each segment, determine a validity of the tensor decomposition by setting MF>80% as a criterion of the validity; if MF<80%, the analysis bandwidth F is reduced to half, and the segments that does not meet the validity requirement is divided into segments according to the reduced analysis bandwidth F to re-process with tensor decomposition until the validity requirement are met or the minimum analysis bandwidth is reached (in this case, the data should be treated as invalid).

S3.5.2: Use $Y^{(1)}=(A \odot B)C^T$, $Y^{(1)} \in C^{IJ \times K}$; $Y^{(2)}=(C \odot A)B^T$, $Y^{(2)} \in C^{KI \times J}$, $Y^{(3)}=(B \odot C)A^T$, $Y^{(3)} \in C^{JK \times I}$ for the loading matrices A, B, C obtained after performing tensor decomposition, where $\odot$ is khatri-Rao product, I, J, K are frequency, time and space (station) scores respectively.

S3.5.3: Use reshape (•) function to convert $Y^{(1)}$ into a cuboid matrix $Y^{(1)} \in C^{I \times J \times K}$. There is a total of K time-frequency slices along the spatial dimension. It can be seen from the nature of tensor decomposition that each slice is composed of independent emitter signals. Perform incoherent accumulation for each slice along the time dimension, estimate the noise floor of the accumulated one-dimensional sequence, determine a threshold value, and find all peaks that exceed the threshold. The frequency corresponding to the maximum value of the peak value is used as the estimated value of the center frequency $f_c$ of the emitter. The number of peaks $N_s$ is used as the estimated value of the emitter bandwidth, and then calculate the frequency occupancy $FO_i=N_s/F$ of the slice, and the frequency occupancy of K slices is averaged to obtain the frequency occupancy FO within the analysis bandwidth. Similarly, accumulate each slice along the frequency dimension and estimate the noise floor of the accumulated one-dimensional sequence to determine a threshold, find all the peaks that exceed the threshold, divide all the peaks that exceed the threshold by the length of time J to get the time occupancy of each slice, then the mean value of the time occupancy of all K slices is used to obtain the time occupancy TO during the monitoring period.

S3.5.4: Use reshape (•) function to convert $Y^{(2)}$ into a matrix cuboid $Y^{(2)} \in C^{K \times I \times J}$, $Y^{(3)}$ into a cuboid matrix $Y^{(3)} \in C^{K \times I \times J}$. According to the flow of S3, the number of peaks that exceed the threshold in the space dimension of the matrix after accumulation along the time dimension and frequency dimension can be estimated separately, and the number of peaks can be divided by K to obtain the space occupancy $SO_{1,2}$, then the root mean square value of $SO_{1,2}$ can be used as the estimated value of the space occupancy SO.

S3.5.5: evaluate the environmental complexity and classifying the environmental complexity as simple, mild, moderate, and severe based on the following standards:

Simple electromagnetic environment: $0 \leq \sqrt[3]{FO \times TO \times SO} \leq 10\%$, Mild electromagnetic environment: $10\% < \sqrt[3]{FO \times TO \times SO} \leq 40\%$, Moderate electromagnetic environment: $40\% < \sqrt[3]{FO \times TO \times SO} \leq 70\%$, Severe electromagnetic environment: $70\% < \sqrt[3]{FO \times TO \times SO} \leq 100\%$.

To identify whether the emitters with the same center frequency in S3 belong to the same emitter or not, the invention adopts KL Divergence to measure the difference of any two signals with the same center frequency in the statistical model, and uses the mutual information I(x, y) method to evaluate its independence. The KL divergence is defined as:

$$d(P, Q) = \sum_i P(i) \log\left(\frac{P(i)}{Q(i)}\right) \quad (3)$$

The mutual information I(x, y) is a method to quantitatively describe the correlation between random processes x and y, which is defined as:

$$I(x, y) = \sum_{y \in Y} \sum_{x \in X} P(x, y) \log\left(\frac{P(x, y)}{P(x)P(y)}\right) \quad (4)$$

It can be seen from equation (4) that if the random process x and y are statistically independent, then P(x,y)=P(x)P(y), ∴I(x,y)=0. The independence of the two random process x and y can be determined by the value of I(x,y).

Figure 7:
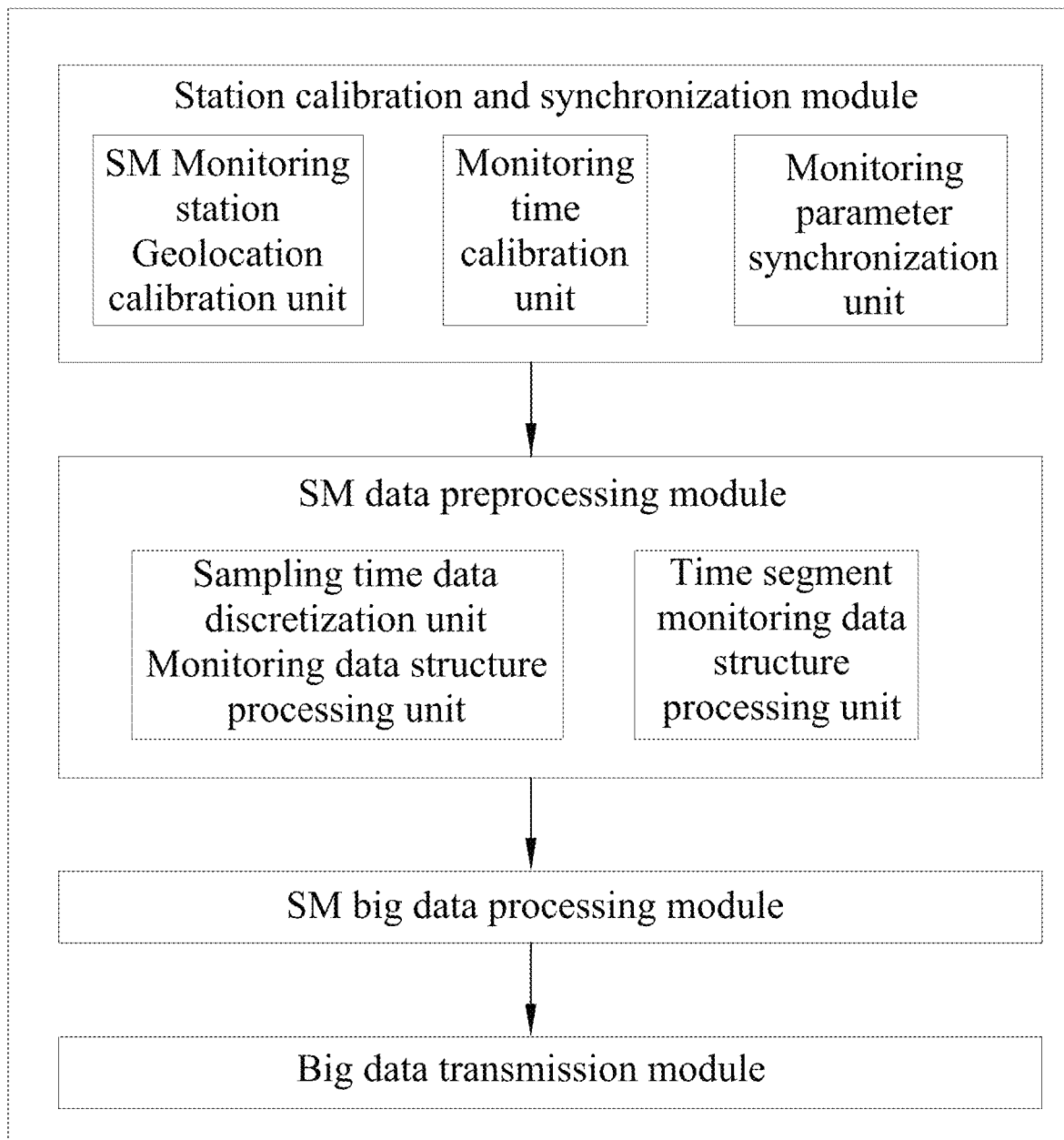
FIG. 7 is a system structure diagram of an internet-based spectrum monitoring system according to the preferred embodiment of the present invention.
Figure 8:
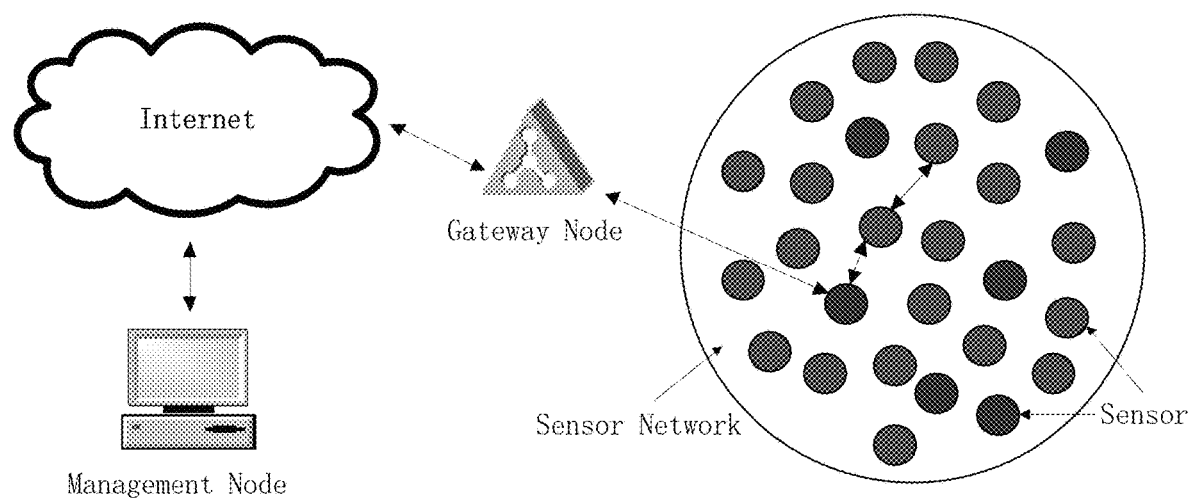
FIG. 8 is a topological structure diagram of the internet-based spectrum monitoring system according to the preferred embodiment of the present invention.
Figure 9:
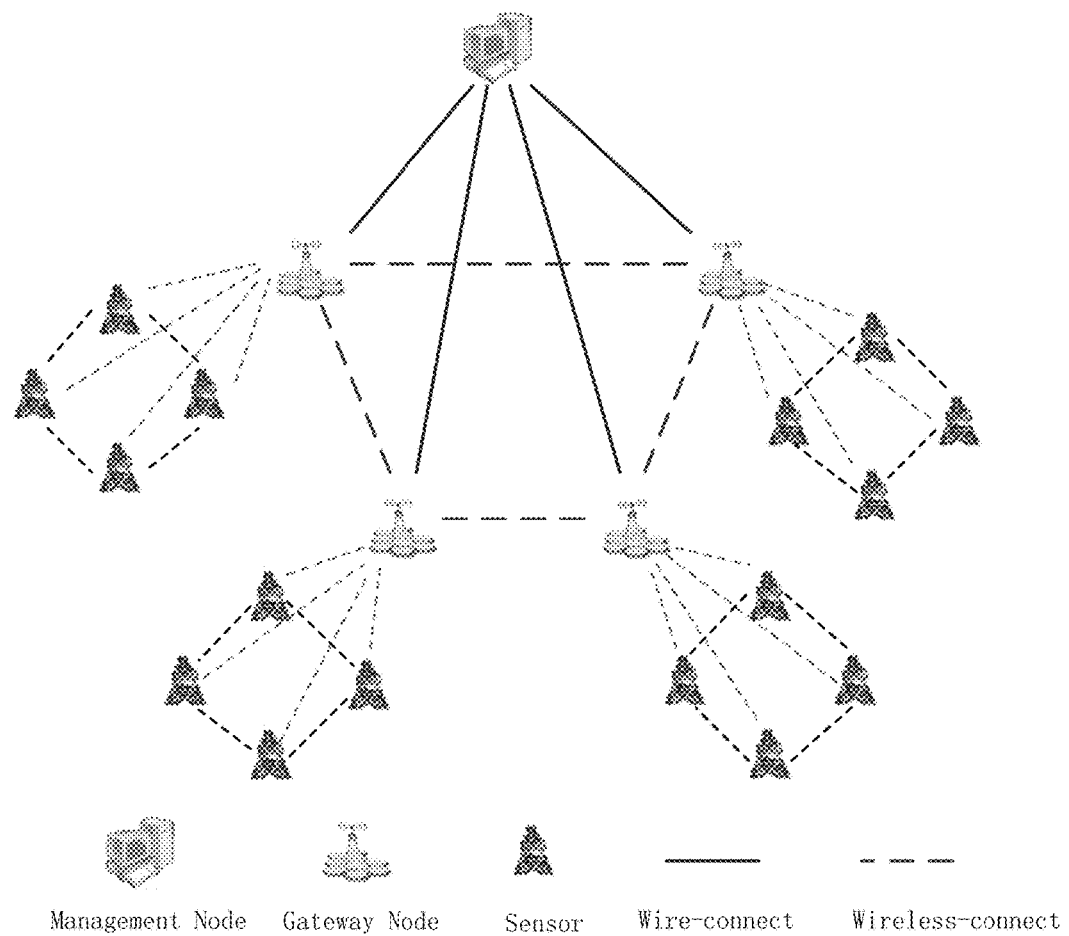
FIG. 9 is a structural block diagram of the spectrum monitoring data processing system according to the preferred embodiment of the present invention.

On the other hand, the present invention also proposes a spectrum monitoring data processing system based on tensor decomposition. FIG. 7 shows the architecture of the spectrum monitoring system, and FIG. 8 shows the topology of the spectrum monitoring system. FIG. 9 shows the structure diagram of the spectrum monitoring system of the present invention.

According to a preferred embodiment of the present invention, a networked spectrum monitoring system realizes a spectrum monitoring network covering a certain area, and the monitoring system can be divided into sub-networks centered on gateway nodes according to the geographical distribution state. Specifically, referring to FIG. 9 of the drawings, the spectrum monitoring processing system comprises: a station calibration and synchronization module, a spectrum monitoring data preprocessing module, and a spectrum monitoring big data processing module.

The station calibration and synchronization module is based on the GNSS system to calibrate the geolocation of the spectrum monitoring station and synchronize the precise monitoring time of the entire network node to realize the time-frequency-space alignment of the regional monitoring data. In particular, the station calibration and synchronization module processes calibration of a geolocation V, and synchronous monitoring clock t, synchronous monitoring time $t_n(0 \ldots N)$ and monitoring sampling point M and bandwidth B.

The station calibration and synchronization module comprises: a geolocation calibration unit; a monitoring time calibration unit; and a parameter synchronization unit.

The geolocation calibration unit uses the satellite navigation and positioning module to obtain the accurate position information of the spectrum monitoring station itself, which is used to identify the position information of the spectrum monitoring data.

The monitoring time calibration unit uses the network, atomic clock, or satellite navigation timing module to calibrate the monitoring station's own clock. The time-calibrated stations can accurately identify the station data in the time dimension and realize the monitoring of multiple stations according to a uniform time step. The traditional calibration method can only process calibration and synchronization of a single station or a local individual station. The calibration method of the present invention can make sure that all stations in the entire monitoring network in time and frequency dimension are consistent.

The parameter synchronization unit is used to synchronously acquire initial spectrum monitoring parameters sent by the central station or the data center. The parameter synchronization unit includes information such as sampling time period, monitoring data sampling interval, monitoring frequency band, and monitoring spectrum sampling rate. These monitoring parameters can be used to discretize and standardize monitoring data. In particular, the method includes the following steps: first, each station in the network receives the standard time information of the GNSS system and calibrates their local clocks. Then, they simultaneously monitor the emitters in the monitoring area according to the monitoring start and end time, sampling frequency and sampling bandwidth issued by the central node.

Referring to FIG. 9 of the drawings, the spectrum monitoring data preprocessing module of the system according to the preferred embodiment of the present invention is used to discretize the spectrum monitoring data at a given time moment and structure the spectrum monitoring data at a given monitoring period. The spectrum monitoring data preprocessing module includes: a sampling time data discretization unit and a monitoring data structure processing unit. The spectrum monitoring data preprocessing module completes the discretization of the monitoring data at a given time and the structured processing of the monitoring data at a given monitoring period, and obtains the one-dimensional spectrum monitoring sequence $I_{t_n}$ at a given sampling time and the two-dimensional spectrum matrix W at a given monitoring time period. The spectrum monitoring data preprocessing module implements steps S2.1-S2.5 as described above.

The sampling time data discretization unit completes the discretization of monitoring data at the given sampling time, and obtain the one-dimensional spectrum monitoring data sequence at the given sampling time according to a required number of spectrum sampling points within the given spectrum bandwidth.

The time-period monitoring data structure processing unit is used to arrange the spectrum monitoring sequence at different sampling time moment in a given monitoring time period according to the time sampling interval of the monitoring data in chronological order to form a two-dimensional spectrum matrix, and then to generate a stereo spectrum cuboid matrix with geolocation information of the monitoring area.

The time-period monitoring data structure processing unit receives the two-dimensional spectrum matrix from the monitoring data preprocessing module, constructs a three-dimensional spectrum matrix Q, decomposes Q into a tensor, identifies the emitter, takes the loading matrices A, B, C as the result of monitoring data compression processing, and then completes the overall compression processing of the monitoring data Q in the given time period. The time-period monitoring data structure processing unit implements steps S3.1-S3.6 as described above.

Referring to FIG. 9 of the drawings, the spectrum monitoring big data processing module according to the preferred embodiment of the present invention is used to complete the tensor decomposition and emitter identification of the spectrum monitoring data in the given time period, and the result of the tensor decomposition is used as the original data for compression processing. The spectrum monitoring big data processing module performs the function as described above in step S3.5.

Referring to FIG. 9 of the drawings, the transmission module of the system according to the preferred embodiment of the present invention transmits the identification result and the compression result to the management center station, the data center or other relay stations. For the compression method, storing the loading matrices A, B, C after tensor decomposition can achieve a high compression ratio to the original data, which is essentially different from the traditional compression method based on data redundancy.

What is claimed is:
1. A method of processing big data for regional spectrum monitoring based on tensor decomposition, comprising the step of:
S1: processing calibration of parameters of a spectrum monitoring station, and determining spectrum monitoring sampling point M and bandwidth B, wherein the parameters comprise a geolocation V, a synchronized clock t, a synchronized time $t_n(0 \ldots N)$;
S2: processing discretization of spectrum monitoring data at a sampling time completely and a structured processing of spectrum monitoring data for a monitoring period to obtain a one-dimensional spectrum monitoring sequence $I_{t_n}$ at the given sampling time and a two-dimensional spectrum monitoring matrix W at the given monitoring period; and
S3: constructing a cuboid matrix Q based on the two-dimensional spectrum monitoring matrix W and processing tensor decomposition for the cuboid matrix Q, wherein step S3 comprises the steps of:
S3.1: calculating a geographical center point $V_0$ on a geographical distribution according to latitude and longitude positions $V_n$ of K number of spectrum monitoring stations, where n equals to 1, 2, 3, . . . , K, where

$$V_0 = \frac{1}{K}\sum_{i=1}^{K} V_i$$

S3.2: calculating the distance $D_n$ between $V_n$ of each spectrum monitoring station and the geographic center point $V_0$, where $\|\cdot\|_2$ is the second-order norm:

$D_n = \|V_n - V_0\|_2$

S3.3: along an ascending order of the distance $D_n$ between the spectrum monitoring station and the geographic center point $V_0$, arranging the corresponding spectrum matrix of the station to construct the spectrum monitoring network cuboid matrix Q, where $Q=[W_1, W_2, \ldots W_K]^T$;
S3.4: performing tensor decomposition on the three-dimensional cuboid matrix Q, setting an analysis bandwidth F and dividing the cuboid matrix Q according to the analysis bandwidth F into segments, processing tensor decomposition for each segment, determining a validity of the tensor decomposition by setting MF>80% as a criterion of the validity; if MF<80%, the analysis bandwidth F is reduced to half, and the segments that does not meet the validity requirement is divided into segments according to the reduced analysis bandwidth F to re-process with tensor decomposition until the validity requirement are met or the minimum analysis bandwidth is reached;
S3.5: based on the results of tensor decomposition, calculating a center frequency, frequency occupancy, time occupancy, space occupancy of the emitter, or evaluating the environmental complexity;
S3.6: performing K-L divergence and mutual information calculations on the co-frequency emitters to identify whether it is an independent emitter or not.
2. The method according to claim 1, wherein step S3.5 comprises the steps of:
S3.5.1: Obtaining loading matrices A, B, C after performing tensor decomposition, where $Y^{(1)}=(A\odot B)C^T$, $Y^{(1)} \in C^{IJ \times K}$; $Y^{(2)}=(C\odot A)B^T$, $Y^{(2)} \in C^{KI \times J}$, $Y^{(3)}=(B\odot C)A^T$, $Y^{(3)} \in C^{JK \times I}$, where $\odot$ is Khatri-Rao product, I, J, K are frequency, time and space (station) points respectively;
S3.5.2: converting $Y^{(1)}$ into a cuboid matrix $Y^{(1)} \in C^{I \times J \times K}$, where there are a total of K time-frequency slices along the spatial dimension, after adding up along the time dimension, dividing the number of peaks exceeding the threshold by F to obtain a frequency occupancy FO within the analysis bandwidth; after adding up along the time dimension, dividing the number of peaks exceeding the threshold by the time length J to obtain a time occupancy TO during the monitoring period;
S3.5.3: converting $Y^{(2)}$ into a cuboid matrix $Y^{(2)} \in C^{K \times I \times J}$, $Y^{(3)}$ into a cuboid matrix $Y^{(3)} \in C^{K \times I \times J}$, after adding up along the time dimension and the frequency dimension, dividing the number of peaks exceeding the threshold by K to obtain a space occupancy SO;
S3.5.4: evaluating the environmental complexity and classifying the environmental complexity as simple, mild, moderate, and severe based on the following standards:

Simple electromagnetic environment: $0 \leq \sqrt[3]{FO \times TO \times SO} \leq 10\%$, Mild electromagnetic environment: $10\% < \sqrt[3]{FO \times TO \times SO} \leq 40\%$, -continued Moderate electromagnetic environment: $40\% < \sqrt[3]{FO \times TO \times SO} \leq 70\%$, Severe electromagnetic environment: $70\% < \sqrt[3]{FO \times TO \times SO} \leq 100\%$.

3. The method according to claim 1, further comprising the steps of:
   S4: performing data transmission, transmitting emitter identification result and compressed data to a management center, a data center or a relay station;
   S5: under control of the management center, calculating three-dimensional coordinates of the emitter by using geolocation information of grid node and time difference between the grid node and the reference node receiving the target emitter signal.

4. A method of processing big data for regional spectrum monitoring based on tensor decomposition, comprising the step of:
   S1: processing calibration of parameters of a spectrum monitoring station, and determining spectrum monitoring sampling point M and bandwidth B, wherein the parameters comprise a geolocation V, a synchronized clock t, a synchronized time $t_n(0 \ldots N)$;
   S2: processing discretization of spectrum monitoring data at a sampling time completely and a structured processing of spectrum monitoring data for a monitoring period to obtain a one-dimensional spectrum monitoring sequence $I_{t_n}$ at the given sampling time and a two-dimensional spectrum monitoring matrix W at the given monitoring period; and
   S3: constructing a cuboid matrix Q based on the two-dimensional spectrum monitoring matrix W and processing tensor decomposition for the cuboid matrix Q,
   S4: performing data transmission, transmitting emitter identification result and compressed data to a management center, a data center or a relay station; and
   S5: under control of the management center, calculating three-dimensional coordinates of the emitter by using geolocation information of grid node and time difference between the grid node and the reference node receiving the target emitter signal,
   wherein step S5 comprises the steps of:
   S5.1: listing emitter characteristic parameters sent by the management center to the gateway nodes of each sub-network, sorting monitoring stations according to signal strength of a target emitter received by the monitoring station, and determining a number of stations that effectively receive an emitter signal N;
   S5.2: forming an emitter positioning grid by the monitoring stations and sorting the monitoring stations according to S3.1~S3.3 to determine the reference station if the number of monitoring stations N≥4;
   S5.3: under the control of the management center, measuring an arrival time of the target emitter signal of each of the monitoring stations based on a calculation of a distance between the particular monitoring station and the reference station, and sending results of measurement to the management center;
   S5.4: the management center estimating geolocation of the emitter based on a difference between the arrival time of the target emitter signal and the distance between the particular monitoring station and the reference station.

5. The method of processing big data for regional spectrum monitoring based on tensor decomposition according to claim 4, wherein step S2 comprises the steps of:

S2.1: obtaining the spectrum monitoring data at the sampling time;
S2.2: processing discretization of the spectrum monitoring data at the sampling time within a given bandwidth B based on a required number of sampling points M to obtain the one-dimensional spectrum monitoring sequence $I_{t_n}$ at the given sampling time, and a dimension of $I_{t_n}$ is 1×M;
S2.3: obtaining the spectrum monitoring sequence $I_{t_0} I_{t_1} \ldots I_{t_N}$ at different sampling time for a given monitoring period according to a sampling time interval of the monitoring data;
S2.4: aligning the spectrum monitoring sequence at different sampling time in chronological order to form a two-dimensional matrix $W=[I_{t_0} I_{t_1} \ldots I_{t_N}]^T$, the matrix W is a two-dimensional matrix in N×M dimension.

6. A spectrum monitoring big data processing system based on tensor decomposition, which comprises a station calibration and synchronization module, a spectrum monitoring data preprocessing module, and a spectrum monitoring big data processing module,
   wherein the station calibration and synchronization module processes calibration of parameters of a spectrum monitoring station, and determining spectrum monitoring sampling point M and bandwidth B, wherein the parameters comprise a geolocation V, a synchronized clock t, asynchronized time $t_n(0 \ldots N)$;
   the spectrum monitoring data preprocessing module completes discretization processing of spectrum monitoring data at a given monitoring time and structured processing of spectrum monitoring data for a given monitoring period to obtain a one-dimensional spectrum monitoring sequence $I_{t_n}$ at the given monitoring time and a two-dimensional spectrum monitoring matrix W at the given monitoring period;
   the spectrum monitoring big data processing module constructs a cuboid matrix Q based on the two-dimensional spectrum monitoring matrix W and processes tensor decomposition for the cuboid matrix Q,
   wherein the spectrum monitoring data preprocessing module comprises:
   a sampling time data discretization unit which completes the discretization of monitoring data at the given sampling time according to a required number of spectrum sampling points within the given spectrum bandwidth; and
   a monitoring data structure processing unit which obtains data of each of the monitoring stations according to the time sampling interval of the monitoring data within the given monitoring time period, and arranges the spectrum monitoring sequence at different sampling time moment in chronological order to form a two-dimensional spectrum matrix,
   wherein the spectrum monitoring big data processing module processes the steps of:
   S1: calculating a geographical center point $V_0$ on a geographical distribution according to latitude and longitude positions $V_n$ of K number of spectrum monitoring stations, where n equals to 1, 2, 3, . . . , K, where $$V_0 = \frac{1}{K}\sum_{i=1}^{K} V_i$$

S2: calculating the distance $D_n$ between $V_n$ of each spectrum monitoring station and the geographic center point $V_0$, where $\|\bullet\|_2$ is the second-order norm:

$$D_n = \|V_n - V_0\|_2$$

S3: along an ascending order of the distance $D_n$ between the spectrum monitoring station and the geographic center point $V_0$, arranging the corresponding spectrum matrix of the station to construct the spectrum monitoring network cuboid matrix Q, where $Q=[W_1, W_2, \ldots W_K]_T$;

S4: performing tensor decomposition on the three-dimensional cuboid matrix Q, setting an analysis bandwidth F and dividing the cuboid matrix according to the analysis bandwidth F into segments, processing tensor decomposition for each segment, determining a validity of the tensor decomposition by setting model fitness MF>80% as a criterion of the validity; if MF<80%, the analysis bandwidth F is reduced to half, and the segments that does not meet the validity requirement is divided into segments according to the reduced analysis bandwidth F to re-process with tensor decomposition until the validity requirement are met or the minimum analysis bandwidth is reached;

S5: based on the results of tensor decomposition, calculating a center frequency, frequency occupancy, time occupancy, space occupancy of the emitter, or evaluating the environmental complexity;

S6: performing K-L divergence and mutual information calculations on the co-frequency emitters to identify whether it is an independent emitter or not.

7. The spectrum monitoring big data processing system based on tensor decomposition according to claim 6, wherein the station calibration and synchronization module comprises:

a geolocation calibration unit which obtains accurate geolocation information of the spectrum monitoring station;

a monitoring time calibration unit which calibrates the clock of the monitoring station; and a parameter synchronization unit which synchronously acquires initial spectrum monitoring parameters, which include: a sampling time period, a monitoring data sampling interval, a monitoring frequency band, and a monitoring spectrum sampling rate.

\* \* \* \* \*